US012792698B2

(12) United States Patent
Cronholm

(10) Patent No.: US 12,792,698 B2
(45) Date of Patent: Nov. 10, 2026

(54) PREVENTING FRAUDULENT USE BY CLONING OF A TRUSTED APPLICATION

(71) Applicant: CRUNCHFISH DIGITAL CASH AB, Malmo (SE)

(72) Inventor: Paul Cronholm, Malmo (SE)

(73) Assignee: CRUNCHFISH DIGITAL CASH AB, Malmö (SE)

( * ) Notice: Subject to any disclaimer, the term of this patent is extended or adjusted under 35 U.S.C. 154(b) by 92 days.

(21) Appl. No.: 18/843,418

(22) PCT Filed: Mar. 2, 2023

(86) PCT No.: PCT/SE2023/050188
§ 371 (c)(1),
(2) Date: Sep. 3, 2024

(87) PCT Pub. No.: WO2023/167625
PCT Pub. Date: Sep. 7, 2023

(65) Prior Publication Data
US 2025/0036750 A1 Jan. 30, 2025

(30) Foreign Application Priority Data
Mar. 3, 2022 (SE) .................................. 2250289-2

(51) Int. Cl.
*G06F 21/12* (2013.01)
*G06F 21/44* (2013.01)
(Continued)

(52) U.S. Cl.
CPC ............ *G06F 21/121* (2013.01); *G06F 21/44* (2013.01); *G06F 21/445* (2013.01); *G06F 21/53* (2013.01);
(Continued)

(58) Field of Classification Search
CPC ...... G06F 21/121; G06F 21/44; G06F 21/445; G06F 21/53; G06F 21/577; G06F 2221/2149
See application file for complete search history.

(56) References Cited

U.S. PATENT DOCUMENTS 5,872,844 A * 2/1999 Yacobi ............... G06Q 20/3678 705/41
2007/0011667 A1 * 1/2007 Subbiah ............. G06F 9/45504 717/148
(Continued)

FOREIGN PATENT DOCUMENTS

EP 3179690 A1 6/2017
EP 3340147 A1 6/2018
(Continued)

OTHER PUBLICATIONS

E. Zaghloul, T. Li, M. W. Mutka and J. Ren, "Bitcoin and Blockchain: Security and Privacy," in IEEE Internet of Things Journal, vol. 7, No. 10, pp. 10288-10313, Oct. 2020, doi: 10.1109/JIOT.2020.3004273. (Year: 2020).*
(Continued)

*Primary Examiner* — Robert B Leung
(74) *Attorney, Agent, or Firm* — Burr & Forman

(57) ABSTRACT

A method prevents fraudulent use by cloning of a trusted application (TA) executable in a secure execution environment (SEE) of a host device (HD). According to the method, the trusted application (TA) starts (310; 406) in a locked mode in which access to protected functionality and data of the trusted application (TA) is prohibited (312). The trusted application performs a handshake procedure (320; 400) with a computerized backend resource (BE) to verify that a current execution state of the trusted application (TA) has not already been occupied by another instance of the trusted application (TA). Only upon successful verification by the
(Continued)

handshake procedure (320; 400) will the trusted application (TA) switch (330; 432) to an unlocked mode in which access to the protected functionality and data is permitted (332).

20 Claims, 6 Drawing Sheets

(51) Int. Cl.
*G06F 21/53* (2013.01)
*G06F 21/57* (2013.01)
(52) U.S. Cl.
CPC .... *G06F 21/577* (2013.01); *G06F 2221/2149* (2013.01)

(56) References Cited

U.S. PATENT DOCUMENTS

| | | | | |
|---|---|---|---|---|
| 2013/0347064 | A1* | 12/2013 | Aissi | G06F 21/53 726/2 |
| 2014/0026196 | A1* | 1/2014 | Hayat | G06F 21/44 726/4 |
| 2018/0330366 | A1* | 11/2018 | Buys | G06Q 20/401 |
| 2020/0127850 | A1* | 4/2020 | Scarlata | H04L 9/3242 |
| 2020/0313893 | A1 | 10/2020 | Thom et al. | |
| 2021/0319094 | A1* | 10/2021 | Hearn | G06F 21/566 |
| 2022/0084013 | A1* | 3/2022 | Kulkarni | G06Q 20/3825 |
| 2022/0245237 | A1* | 8/2022 | Briongos | G06F 21/53 |
| 2023/0222209 | A1* | 7/2023 | Almeida | G06F 21/51 726/23 |
| 2023/0344649 | A1* | 10/2023 | Zamani | G06Q 20/3227 |

FOREIGN PATENT DOCUMENTS

| | | | |
|---|---|---|---|
| EP | 2795829 | B1 | 5/2020 |
| SE | 2151401 | A1 | 5/2023 |
| SE | 2250076 | A1 | 6/2023 |
| WO | 2013188830 | A1 | 12/2013 |
| WO | 2017208064 | A1 | 12/2017 |
| WO | 2019185126 | A1 | 10/2019 |
| WO | 2021154136 | A1 | 8/2021 |
| WO | 2021251889 | A1 | 12/2021 |
| WO | 2022020523 | A1 | 1/2022 |
| WO | 2022164375 | A1 | 8/2022 |
| WO | 2022173360 | A1 | 8/2022 |

OTHER PUBLICATIONS

T. C. Lam and V. K. Wei, “A mobile agent clone detection system with itinerary privacy,” Proceedings. Eleventh IEEE International Workshops on Enabling Technologies: Infrastructure for Collaborative Enterprises, Pittsburgh, PA, USA, 2002, pp. 68-73, doi: 10.1109/ENABL.2002.1029991. (Year: 2002).*

Irwan et al. “Mobile Agent Platform based Wallet for Preventing Double Spending in Offline e-Cash,” International Journal of Advanced Computer Science and Applications (IJACSA), vol. 10, No. 9, pp. 584-591, 2019. (Year: 2019).*

International Search Report and Written Opinion issued in corresponding International Application No. PCT/SE2023/050188 mailed Apr. 28, 2023, all pages cited in its entirety.

* cited by examiner

TO FIG 4B

PREVENTING FRAUDULENT USE BY CLONING OF A TRUSTED APPLICATION

TECHNICAL FIELD

The present invention generally relates to digital security. More particularly, the present invention relates to technical improvements to prevent fraudulent use by cloning of a trusted application executable in a secure execution environment of a host device. Even more particularly, the present invention relates to a method, host device, trusted application and computerized backend resource for such prevention of fraudulent use.

BACKGROUND

Digital security is a collective term for the protection of functionality and data from unwarranted information disclosure, theft or damage. Digital security broadly relates to the protection of hardware, software and data. A host device, also known as a network host, is a hardware device being adapted to communicate with other hosts on a network. Host devices in a network may comprise clients and servers that send or receive data, services or applications.

In line with the rapidly expanding information technology development of the recent decades, software is consistently becoming more and more complex. It is not uncommon that software projects can comprise millions of lines of code. A downside of this is that every line of code could potentially be associated with a bug caused by, for instance, a programming error. Each bug is a potential attack vector for e.g. a person or script with malicious intent. Clearly, different bugs may expose different security vulnerabilities. Some bugs can easily be detected, while others are not so easily identified. Operating system kernel bugs are particularly crucial to manage, because if bugs are exploited in the kernel there is a risk of compromising the security of the entire system.

In order to securely execute protected functionality and data within the host device, the host device is thus commonly configured with a variety of different computerized security arrangements. Security arrangements may serve different purposes, wherein one purpose is to manage execution privileges of certain protected functionality and data. The protected functionality and data may be maintained in various physical or virtual locations of the security arrangement. Known security arrangements in the art typically involve hardware-based protection, software-based protection, or combinations, for providing a secure execution environment for the protected functionality and data.

Hardware-based protection involves partitioning a traditional kernel execution environment into two separate and respectively isolated execution environments, commonly referred to as a rich execution environment, REE, and a trusted execution environment, TEE. The TEE provides security features that isolate the integrity of applications executing within the TEE, along with confidentiality of their resources. Applications being executed in the TEE are therefore typically associated with a higher level of security compared to applications being executed in the REE. Hence, the applications being executed in the TEE are commonly being referred to as trusted applications. Although trusted applications are running in the TEE, they will still need to access protected functionality and data maintained by hardware resources. Accordingly, the requested hardware is typically supported by various hardware support which assures that the trusted applications can securely access the protected hardware resources.

Software-based protection involves providing a virtual execution environment within the software of the host device. The trusted applications are only allowed to be executed in the virtual execution environment. A virtual storage is provided within the virtual execution environment, wherein the trusted applications running in the virtual execution environment are configured to access protected functionality and data in the virtual storage.

Even if one of the security arrangements mentioned above are in place, the host device may still be prone to one or more security vulnerabilities.

Particularly, security vulnerabilities may be exposed when cloning is performed. Cloning is a technique wherein an additional identical instance of, for instance, the entire host device or the trusted application running therein, depending on the security arrangement, is created. The clone may escalate system privileges for a user by acting as the original trusted application or host device. Accordingly, cloning techniques aim to overcome computer system limitations being deliberately (or possibly unintentionally) placed there for security, administrative, marketing or other reasons. Escalating system privileges may be done with malicious intent, e.g. by a malicious user attempting to hack the host device, or with the intent of being able to fully access all of the functionality of the host device. As an example, Apple do not provide a "developer-mode" for operating systems in their devices, nor any other mechanism for selectively bypassing the established security model. Hence, in order for e.g. researchers to fully explore the device, they are forced to disassemble one or more security layers of the device. This is called jailbreaking. Other cloning techniques exist for other devices having other operating systems, for instance rooting of Android devices.

Cloning a host device may give rise to some critical security vulnerabilities relating to fraudulent use by cloning of a trusted application (either being cloned in isolation, or as a result of a cloning of the entire host device). For instance, one such security vulnerability is related to the double-spending problem. The double-spending problem may occur for a secure digital wallet being executed as a trusted application in a secure execution environment. If a clone of the trusted application is generated and continues to operate in an offline mode for which no instant online payment verification can be made, digital currency can be consumed from the secure digital wallet of the clone. If the currently executing trusted application is subsequently switched from the clone back to the original trusted application instance, while the secure digital wallet is still offline, the original trusted application instance may once more consume the same digital currency already consumed by the cloned instance. The same digital currency is thus consumed twice, i.e. double-spending. Clearly, triple-spending, or practically any multi-spending is also a possibility in the case wherein a plurality of trusted application instances are generated by cloning. Other related security vulnerabilities may be realized in other scenarios, for instance multi-usage of any finite resource, exploiting license timers for e.g. subscriptions or accounts or exploiting expiry timers, to name a few.

SUMMARY

In line with the observations above, the present inventor has made valuable technical insights to solve or at least mitigate one or more of the problems or drawbacks identified in the background section.

A first inventive aspect is a method of preventing fraudulent use by cloning of a trusted application which is executable in a secure execution environment of a host device. According to this method, the trusted application starts in a locked mode in which access to protected functionality and data of the trusted application is prohibited. The trusted application performs a handshake procedure with a computerized backend resource to verify that a current execution state of the trusted application has not already been occupied by another instance of the trusted application. Only upon successful verification by the handshake procedure, the trusted application switches to an unlocked mode in which access to the protected functionality and data is permitted.

A second inventive aspect is a host device for preventing fraudulent use by cloning of a trusted application, the host device being configured for running the trusted application in a secure execution environment of the host device. The host device is configured to start the trusted application in a locked mode in which access to protected functionality and data of the trusted application is prohibited. The host device is further configured to perform a handshake procedure for the trusted application with a computerized backend resource to verify that a current execution state of the trusted application has not already been occupied by another instance of the trusted application. Moreover, the host device is configured, only upon successful verification by the handshake procedure, to switch the trusted application to an unlocked mode in which access to the protected functionality and data is permitted.

A third inventive aspect is a trusted application for preventing fraudulent use by cloning of the trusted application, the trusted application comprising computer program code being executable in a secure execution environment of a host device. The trusted application is configured to start in a locked mode in which access to protected functionality and data of the trusted application is prohibited, perform a handshake procedure with a computerized backend resource to verify that a current execution state of the trusted application has not already been occupied by another instance of the trusted application, and, only upon successful verification by the handshake procedure, switch to an unlocked mode in which access to the protected functionality and data is permitted.

A fourth inventive aspect is a computerized backend resource for preventing fraudulent use by cloning of a trusted application executable in a secure execution environment of a host device. The computerized backend resource is configured to participate in a handshake procedure with the trusted application starting in a locked mode in which access to protected functionality and data of the trusted application is prohibited. Participation in the handshake procedure seeks to verify that a current execution state of the trusted application has not already been occupied by another instance of the trusted application and to enable the trusted application, only upon successful verification by the handshake procedure, to switch to an unlocked mode in which access to the protected functionality and data is permitted.

These inventive aspects introduce functionality which can be seen as a logical lock feature: trusted applications are logically locked at start-up, until being unlocked through a successful handshake procedure with a trusted network resource (i.e. the computerized backend resource). The logical lock feature provides enhanced protection against fraudulent use by cloning of a trusted application which is executable in a secure execution environment, such as a hardware-based trusted execution environment or a software-based virtual execution environment. Hence, the logical lock feature can be seen as an add-on security level which provides further security to existing solutions for secure execution environments.

Other aspects, objectives, features and advantages of the inventive aspects will appear from the following detailed disclosure as well as from the claims and the drawings. Generally, all terms used herein are to be interpreted according to their ordinary meaning in the technical field, unless explicitly defined otherwise herein.

In this document, the terms "clone" and "copy" are used interchangeably when described together with a trusted application. An "instance" is in this setting referring to one instance of the trusted application. An instance may therefore be either one of the original trusted application or any one of the existing clones thereof. An instance, clone or copy of the trusted application is to be interpreted as an identical copy of the trusted application that can be executed in a similar way as the original trusted application, although not simultaneously. Clones, instances or copies of the trusted application may be generated as a result of e.g. rooting, jailbreaking, or other such mechanisms with the objective of escalating access privileges of a device (i.e. software or hardware thereof).

It should be emphasized that the term "comprises/comprising" when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

Expressions like "[entity] is configured for . . . [performing activity]" or "[entity] is configured to . . . [perform activity]" will include typical cases where a computerized entity (having one or more controllers, processing units, programmable circuitry, etc.) executes software or firmware installed in the computerized entity, wherein the execution occurs in order to perform the activity in question.

BRIEF DESCRIPTION OF THE DRAWINGS

The foregoing will be apparent from the following more particular description of the example embodiments, as illustrated in the accompanying drawings. The drawings are not necessarily to scale, emphasis instead being placed upon illustrating the example embodiments.

DETAILED DESCRIPTION OF EMBODIMENTS

Figure 1:
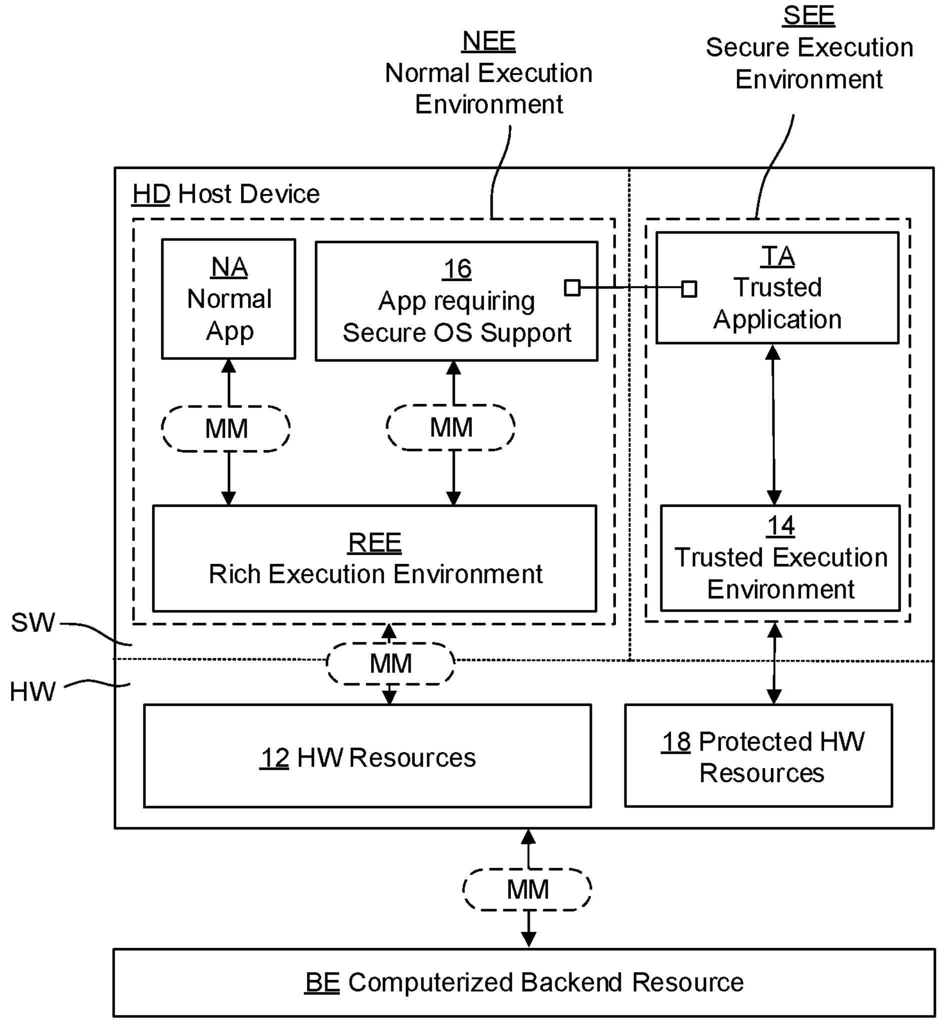
FIG. 1 is a schematic block diagram of a host device running a trusted application in a secure execution environment being a trusted execution environment according to one embodiment.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like reference signs refer to like elements.

The following disclosure is related to fraudulent use by cloning. In view of the foregoing Background discussion and in light of the following disclosure, it is understood that not all types of cloning, per se, involve security risks, such as jailbreaking or rooting. Cloning of trusted applications is thus not necessarily indicative of fraudulent behaviour. It is only the fraudulent use by cloning, for instance a use relating to fraudulent switching between clones or fraudulent generation of a plurality of clones, of trusted applications that may involve security risks. The present disclosure is directed at prevention of such fraudulent use as accomplished by various cloning techniques.

Figure 2:
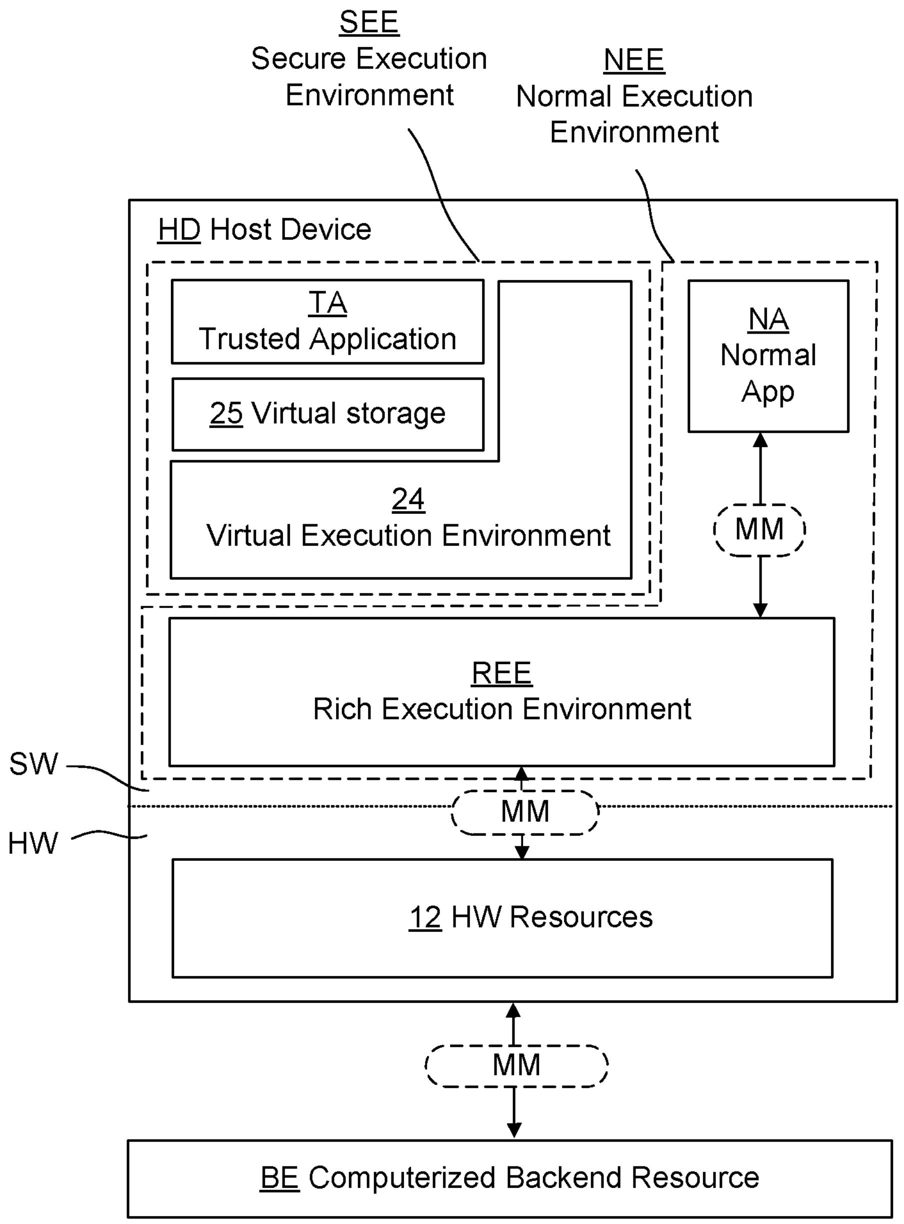
FIG. 2 is a schematic block diagram of a host device running a trusted application in a secure execution environment being a software-based virtual execution environment according to one embodiment.

With reference to FIGS. 1 and 2, schematic block diagrams of a host device HD are shown according to two different embodiments. The embodiments represent computer architecture schemes in which the inventive concepts of the present disclosure may be applied. The objective of both of the embodiments is to provide a secure execution of protected functionality and data. The computer architecture schemes are, as such, established concepts in the art. As discussed in the background section, there are, however, limitations of existing computer architecture schemes in relation to fraudulent use by cloning of software or hardware resources of the host device HD.

For reasons of brevity, FIGS. 1 and 2 will be explained without care being taken as to whether or not execution is allowed of certain resources. The focus is instead to present typical computer architecture schemes wherein the subject-matter of the present disclosure can mitigate fraudulent use by cloning. As will become apparent later on in the disclosure, a handshake procedure firstly has to be performed in order to verify that a current execution state of certain resources has not already been occupied by another instance of said resources. The following description relating to FIGS. 1 and 2 assumes that the host device HD is operating in an unlocked mode.

As seen in FIGS. 1 and 2, the host device HD is configured for running a trusted application TA. The trusted application TA is executable in a secure execution environment SEE of the host device HD. For instance, the host device HD may be a mobile communication device, such as a mobile phone, smart phone, tablet computer, personal digital assistant, smart glasses, smart watch, smart card or smart wearable (e.g. smart bracelet), or any combination thereof. The host device HD may alternatively be any type of computer device capable of securely executing protected functionality and data.

The host device HD is a device that may be e.g. jailbroken or rooted such that instances thereof can be cloned. Jailbreaking or rooting, as was discussed in the background section of this document, may allow a user to take full or at least partial control of functionality and data protected by computer security layers of varying privilege levels, including software and/or hardware resources. Technical details of the host device HD will now be thoroughly provided for, with reference to the embodiments of FIGS. 1 and 2, respectively.

The host device HD shown in FIG. 1 implements a hardware-based computer architecture scheme. The architecture scheme partitions a traditional kernel execution environment into two separate and respectively isolated execution environments, the environments being a normal execution environment NEE and a secure execution environment SEE.

The normal execution environment NEE is a non-secure world in the sense that one or more untrusted "normal" applications NA can be executed in a rich execution environment REE. The rich execution environment REE is adapted to run any type of embedded operating system or a general-use operating system, such as Android, iOS, Linux or Windows. Although not shown, it is implicit that the rich execution environment REE may access the normal applications NA through one or more application programming interfaces (APIs). The normal applications NA may thus be any type of web, native or hybrid applications being provided by an application service provider that is not trusted by the host device HD. The rich execution environment REE is adapted to access hardware resources (including firmware resources) 12 of the host device HD through, for instance, a hypervisor (not shown). Hardware resources 12 may include processing units, DRAMs, drivers, and so forth.

A normal application NA may be an application 16 requiring secure operating system support. This application 16 cannot be securely executed in the rich execution environment REE. For instance, the application 16 requiring secure OS support may be an application that comprises information that has to be protected against unwarranted disclosure, i.e. comprising data pertaining to e.g. monetary means, confidentiality information, or some other sensitive data. Alternatively, a computer program may require the execution of two different applications, one being a normal application NA and the other being an application 16 requiring secure OS support. An example of this may be a payment application service (normal application NA) being in communication with a secure digital wallet (application 16 requiring secure OS support). Execution of the application 16 requiring secure OS support involves separating it from the normal execution environment NEE and maintaining it in the secure execution environment SEE as a trusted application TA. The trusted application TA may be a secure digital wallet for a payment application service. One example of a digital payment system for such purposes will be described later with reference to FIG. 5.

The secure execution environment SEE is a secure world in the sense that the trusted application TA can be executed in a trusted execution environment 14. The trusted execution environment 14 is adapted to access and execute protected functionality and data which are maintained by protected hardware resources 18, e.g. buses, peripherals, memory regions, interrupts, and so forth. The trusted execution environment 14 may be implemented in any trusted execution environment technology known in the art, including but not limited to Samsung TEEGRIS, Qualcomm TEE, Huawei iTrustee, Trustonic Kinibi, Google Open Source Trusty, Open Portable TEE, Nvidia's Trusted Little Kernel for Tegra, Sierra TEE, ProvenCore TEE, Trusty TEE for Android, or TrustKernel T6. The protected hardware resources 18 may be protected by any hardware support technologies known in the art, including but not limited to Arm's TrustZone, MultiZone Security, AMD Platform Security Processor, Intel Software Guard Extensions, Apple's Secure Enclave Processor, or Google's Titan M.

As further seen in FIG. 1, the host device HD is in communication with a computerized backend resource BE. The computerized backend resource BE may, for instance, be a trusted third party. The host device HD is configured to verify an execution state of the trusted application TA for verifying whether access to the protected functionality and data of the protected hardware resources 18 is permitted.

An execution state of an application is, as such, a concept known to the person skilled in the art. The skilled person knows that computerized execution is the process of, by for instance a computer or virtual machine, reading and acting on instructions of a computer program. In this case the computer program is the trusted application TA. Each instruction (or statement, expression, etc.) of the trusted application TA is an action being carried out by the computer in order to solve a task, and a control unit of the computer sequentially performs cycles of fetching, decoding and executing said instructions. The execution state thus dynamically changes as the program runs. To this end, the trusted application TA will transition between states for each step during these sequentially performed cycles. During the time in which a handshake procedure is carried out (as will be thoroughly explained later on in this disclosure), it is thus realized that current execution states of the trusted application TA are verified, which means that it is determined whether access to the protected functionality and data of the protected hardware resources is permitted.

In view of the above explanation of the (current) execution state, it is also realized that different execution states may be temporally compared to one another for determining statuses, i.e., which execution state is the current execution state, of the trusted application TA. Such temporal comparisons may identify older execution states, i.e., previous execution states of the trusted application TA that were active at some point in time in the past. When comparing an older execution state to a current execution state, the older state may thus be used as a reference point to analyze how the program has changed over time. In this case, that would correspond to determining whether a current execution state of the trusted application TA has not already been occupied by another instance of the trusted application TA that has been executed in the place of the original instance. Further details of the verification procedure will be described later on with reference to FIGS. 3 and 4A-B.

Communication between the host device HD and the backend resource BE may be via a cloud network (such as, for instance, WAN network 510 in FIG. 5), or alternatively any other suitable types of long-range or short-range communication standards known in the art. For instance, short-range communication interfaces include, for instance, IEEE 802.11, IEEE 802.15, ZigBee, WirelessHART, WiFi, Bluetooth®, BLE, RFID, WLAN, MQTT IoT, CoAP, DDS, NFC, AMQP, LoRaWAN, Z-Wave, Sigfox, Thread, EnOcean, mesh communication, or any other form of proximity-based device-to-device radio communication signal such as LTE Direct. Long-range communication interfaces may include, for instance, W-CDMA/HSPA, GSM, UTRAN, LTE or Starlink.

The backend resource BE may be maintained as a cloud-based server implemented using any commonly known cloud-computing platform technologies, such as e.g. Amazon Web Services, Google Cloud Platform, Microsoft Azure, DigitalOcean, Oracle Cloud Infrastructure, IBM Bluemix or Alibaba Cloud. The cloud-based server may be included in a distributed cloud network that is widely and publically available, or alternatively limited to an enterprise. Alternatively, the server may in some embodiments be locally managed as e.g. a centralized server unit.

Other alternative server configurations may be realized, based on any type of client-server or peer-to-peer (P2P) architecture. Server configurations may thus involve any combination of e.g. web servers, database servers, email servers, web proxy servers, DNS servers, FTP servers, file servers, DHCP servers, to name a few.

An example of the operation of a mobile payment application will now be described. The mobile payment application is a normal application NA. In order to perform a payment operation, the normal application NA is running together with an application 16 that requires secure OS support, for instance a secure digital wallet. A mechanism for communication between the normal execution environment NEE and the secure execution environment SEE is therefore solicited by the host device HD. Accordingly, the normal application NA goes through a process to load and communicate with the trusted application TA corresponding to the secure digital wallet. The trusted application TA is located within the secure execution environment SEE and communication thereto can be established through specific communication channels and APIs available to both the normal execution environment NEE and the secure execution environment SEE. Moreover, interface(s) is/are also provided in order to perform the access verification procedure with the computerized backend resource BE, for instance the Internet.

These communication channels and APIs are indicated by the arrows in FIG. 1, which inevitably enlarge the attack surface of the host device HD and thus introduce new attack vectors. Each attack vector may be targeted by a Man-in-the-Middle attack, as indicated by "MM" in the figure. It is important to note that the Man-in-the-Middle MM is not necessarily a person, resource or computer program with malicious intent. It may alternatively be any intermediate program, resource, service, API, task, OS, or similar, that operate in between two programs, resources, services, tasks, OSs, or similar, that exchange data. For instance, the normal application NA may be considered a Man-in-the-Middle MM.

Critical privilege escalation attacks may thus be introduced to the host device HD via one or more of the Man-in-the-Middle layers. Data being sent within, from or to the host device HD has to be verified. However, the execution of a verification procedure has to be performed in a safe way. Performing an execution verification procedure involves introducing a plurality of additional attack vectors, including at least an access request signal and an access response signal. If one or more clones of the trusted application TA are generated, it is possible to accomplish fraudulent use by manipulating one or more of the request or response signals associated with any of the clones and/or by switching between clone instances.

To summarize, communication to, from and within the host device HD can be targeted by Man-in-the-Middle MM attacks. Using the implementation shown in FIG. 1, hardware-based cloning can be performed of e.g. the hardware resources 12 as they are not protected. Moreover, software-based cloning can be performed on e.g. the trusted application TA, or resources in the normal execution environment NEE.

The host device HD shown in FIG. 2 implements a software-based computer architecture scheme. The architecture scheme partitions a traditional kernel execution environment into two separate and respectively isolated execution environments: a normal execution environment NEE and a secure execution environment SEE.

The normal execution environment NEE is a non-secure world in the sense that one or more untrusted "normal" applications NA can be executed in a rich execution environment REE. The rich execution environment REE is adapted to run any type of embedded operating system or a general-use operating system, such as Android, iOS, Linux or Windows. Although not shown, it is realized that the rich execution environment REE may access the normal applications NA through one or more application programming interfaces (APIs). The normal applications NA may thus be any type of web, native or hybrid application being provided by an application service provider that is not trusted by the host device HD. The rich execution environment REE is adapted to access hardware resources (including firmware resources) 12 of the host device HD, for instance through a hypervisor (not shown). Hardware resources 12 may include processing units, DRAMs, drivers, and so forth.

The secure execution environment SEE is a secure world in the sense that the trusted application TA can be executed in a secured virtual execution environment 24. The trusted application TA is thus protected by software. The virtual execution environment 24 is adapted to access and execute protected functionality and data which is maintained in an encrypted virtual storage 25. Any suitable virtual execution environment technologies known in the art may be implemented. For instance, the virtual execution environment 24 may be implemented generally according to subject-matter disclosed in the European patent EP 2 795 829 B1. The referenced patent discloses a mapping between each trusted application TA and a combination of an application domain name and a device identifier being represented as a unique fingerprint. If the trusted application TA is cloned into another device, or the application domain name is being changed for some reason, the virtual execution environment 24 will not allow execution thereof. Accordingly, computer systems implementing a software-based virtual execution environment 24, at least according to the referenced patent application, restrict cloning of hardware resources. However, protection cannot be guaranteed for clones of the trusted application TA in the same host device HD that uses the same application domain name. It is therefore possible to generate one or more clones of the trusted application TA in the same host device HD and switch between the clones to accomplish fraudulent use of the clones.

As further seen in FIG. 2, the host device HD is in further communication with a computerized backend resource BE. The functionality of the computerized backend resource BE corresponds to the functionality as discussed with reference to FIG. 1.

Similar to the subject-matter discussed with reference to FIG. 1, a plurality of communication channels and APIs can be targeted by a Man-in-the-Middle attack, as indicated by "MM" in the figure.

To summarize, clones of the trusted application TA can be generated by software-based cloning.

It was described with reference to FIGS. 1 and 2 that trusted application TA was assumed to be operating in an unlocked mode, i.e. having full execution privileges to the protected functionality and data maintained in either the protected hardware resources 18 (FIG. 1) or the encrypted virtual storage 25 (FIG. 2). In order to obtain execution privileges, mutual trust between the trusted application TA and a trusted third party, such as the computerized backend resource BE, has to be established. This may be established using a special type of handshake procedure, which will now be described with reference to FIGS. 3 and 4A-B.

A handshake procedure is, as such, well known to the person skilled in the art. The skilled person understands that the term handshake procedure inherently implies technical implications involving a series of steps for establishing a connection between parties. In this case, the parties are represented by the trusted application TA and the computerized backend resource BE. A conventional handshake procedure sometimes, involves authentication, exchange of keys, and negotiated parameters to be used for encryption or decryption of data transmitted between said parties, thereby assisting in ensuring that the communication between the parties is secure, private and protected from unauthorized access and/or tampering. In the following example with reference to FIGS. 3 and 4A-B, a specially modified handshake procedure is explained, which aims to prevent fraudulent use by cloning of the trusted application TA.

Figure 3:
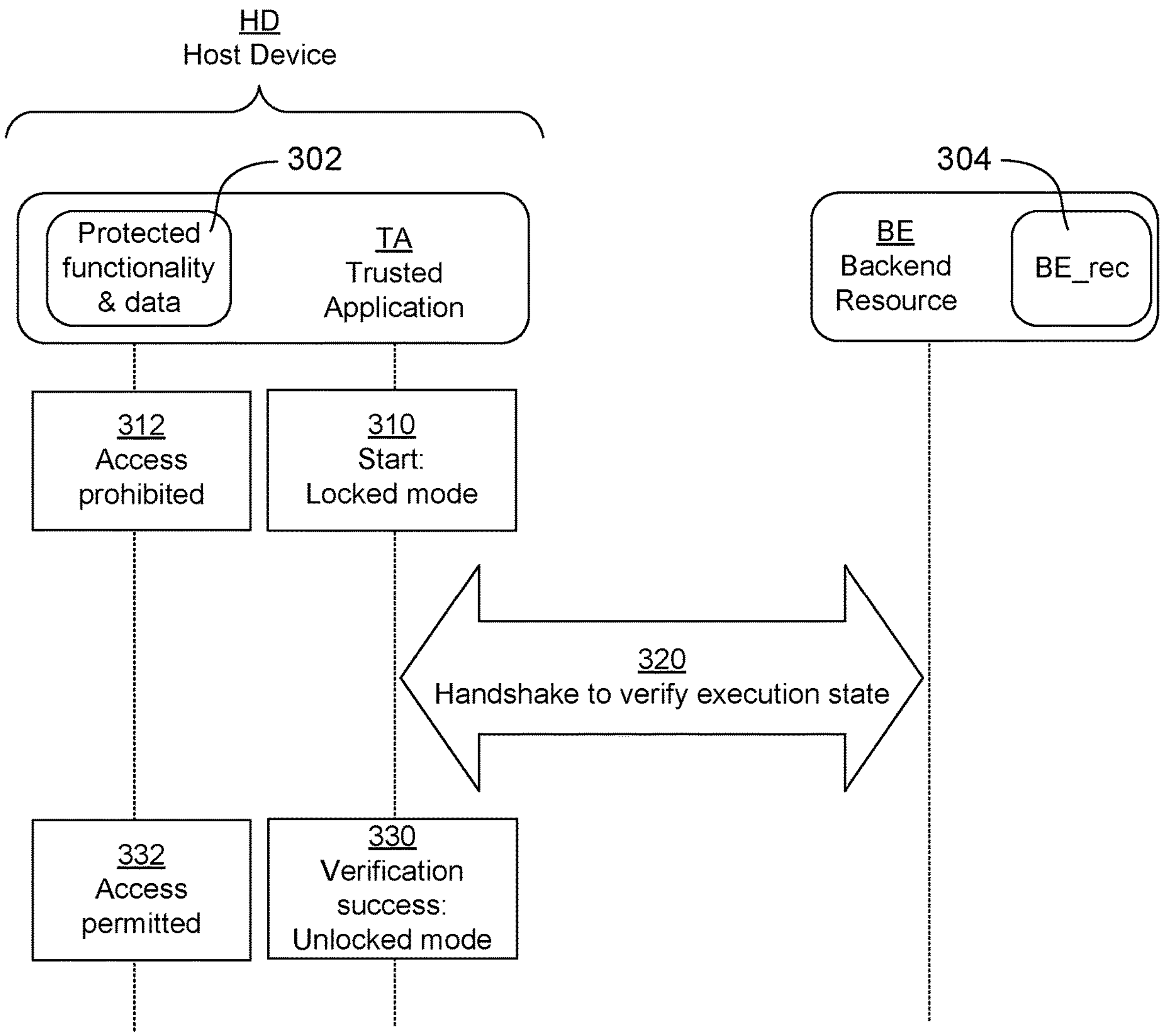
FIG. 3 is a schematic flowchart diagram illustrating a method of preventing fraudulent use by cloning of a trusted application generally according to the present invention, as well as an associated host device, trusted application and computerized backend resource.

FIG. 3 illustrates a method of preventing fraudulent use by cloning of a trusted application TA. As already explained, the trusted application TA is executable in a secure execution environment SEE of a host device HD. According to the fraud prevention method, the trusted application TA starts 310 in a locked mode. In the locked mode, access to protected functionality and data 302 of the trusted application TA is prohibited, as can be seen at 312.

It is recalled that if the security of the host device HD has been jeopardized by activities such as jailbreaking or rooting, the trusted application TA may have been cloned for malicious purposes. To prevent fraudulent use by such cloning activities, after having started at 310, the trusted application TA performs a handshake procedure 320 with the computerized backend resource BE to verify that a current execution state of the trusted application TA has not already been occupied by another instance of the trusted application TA. Only upon successful verification by the handshake procedure 320 will the trusted application TA switch 330 to an unlocked mode. In the unlocked mode, access to the protected functionality and data is permitted, as can be seen at 332. Hence, the method made up of steps 310, 320 and 330 introduces novel and inventive functionality which can be seen as a logical lock feature—trusted applications are logically locked at start-up, until being unlocked through a successful handshake procedure with a trusted network resource (i.e. the computerized backend resource BE).

From a host device perspective, FIG. 3 also illustrates the host device HD configured for running the trusted application in the secure execution environment SEE of the host device HD. In compliance with the method described above, the host device HD is configured to start 310 the trusted application TA in a locked mode in which access to protected functionality and data of the trusted application TA is prohibited 312, perform a handshake procedure 320 for the trusted application TA with the computerized backend resource BE to verify that a current execution state of the trusted application TA has not already been occupied by another instance of the trusted application TA, and, only upon successful verification by the handshake procedure 320, switch 330 the trusted application TA to an unlocked mode in which access to the protected functionality and data is permitted 332.

From a trusted application perspective, FIG. 3 further illustrates the trusted application TA comprising computer program code being executable in the secure execution environment SEE of the host device HD. The trusted application TA is configured to start 310 in a locked mode in which access to protected functionality and data of the trusted application is prohibited 312, perform a handshake procedure 320 with the computerized backend resource BE to verify that a current execution state of the trusted application TA has not already been occupied by another instance of the trusted application TA, and, only upon successful verification by the handshake procedure 320, switch 330 to an unlocked mode in which access to the protected functionality and data is permitted 332.

Finally, from a backend perspective, FIG. 3 illustrates the computerized backend resource BE for preventing fraudulent use by cloning of the trusted application TA which is executable in the secure execution environment SEE of the host device HD. The computerized backend resource BE is configured to participate in a handshake procedure 320 with the trusted application TA starting 310 in a locked mode in which access to protected functionality and data of the trusted application TA is prohibited 312, in order to verify that a current execution state of the trusted application TA has not already been occupied by another instance of the trusted application TA and to enable the trusted application TA, only upon successful verification by the handshake procedure 320, to switch 330 to an unlocked mode in which access to the protected functionality and data is permitted 332.

In some embodiments of the aforementioned method, host device, trusted application and computerized backend resource, the computerized backend resource BE maintains a record BE_rec (seen at 304 in FIG. 3) of most recent execution states as reported by instances of trusted applications during previous handshake procedures. Then, in the current handshake procedure 320, the trusted application TA reports the current execution state to the computerized backend resource BE. The computerized backend resource BE will abort the handshake procedure 320 if the reported current execution state is older than the most recent execution state of the trusted application TA according to the record BE_rec maintained by the computerized backend resource BE.

In some embodiments, the trusted application TA maintains a representation of its execution state. The representation is a monotonic function of execution progress, and the trusted application TA will report the current execution state to the computerized backend resource BE during the handshake procedure 320 by communicating a current value of this representation. The record BE_rec as maintained by the computerized backend resource BE will contain a corresponding value of the aforesaid representation at the most recently reported execution state of the trusted application TA. Representing execution states as a monotonic function of execution progress will in effect mean that a current execution state will be "younger" or "newer" than an execution state that has occurred previously during the execution progress of the trusted application TA.

Advantageously, the representation of execution state as maintained by the trusted application TA comprises a trusted application counter value wallet_counter being incremented during the handshake procedure 320. The record BE_rec as maintained by the computerized backend resource BE will then comprise a corresponding backend counter value wallet_instance_counter for the trusted application TA. A particularly refined example of such a counter mechanism will now be described with reference to FIGS. 4A-B.

Figure 4A:
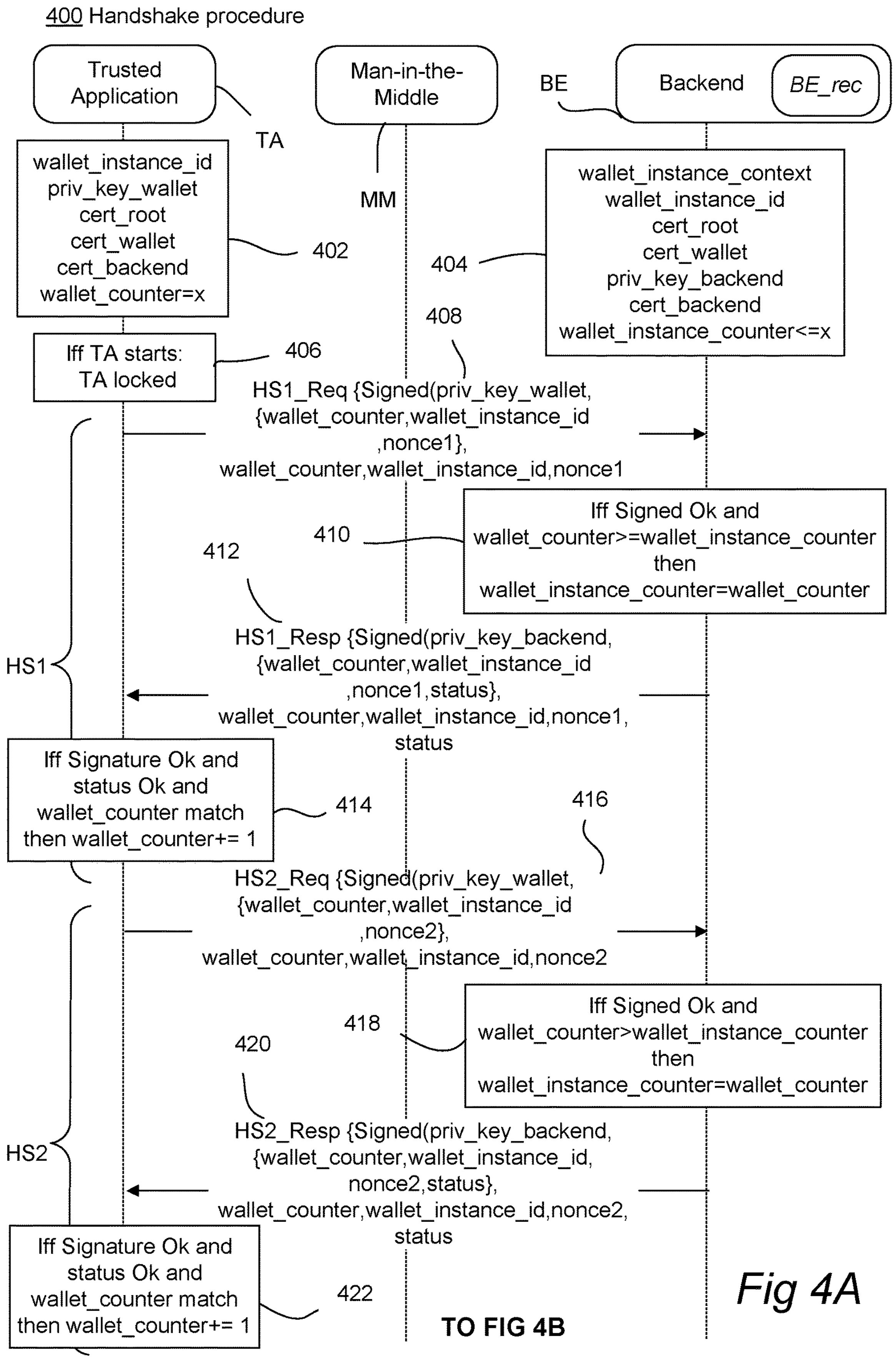
FIGS. 4A and 4B are two parts of a detailed flowchart diagram of a method of preventing fraudulent use by cloning of a trusted application according to an embodiment of the present invention.
Figure 4B:
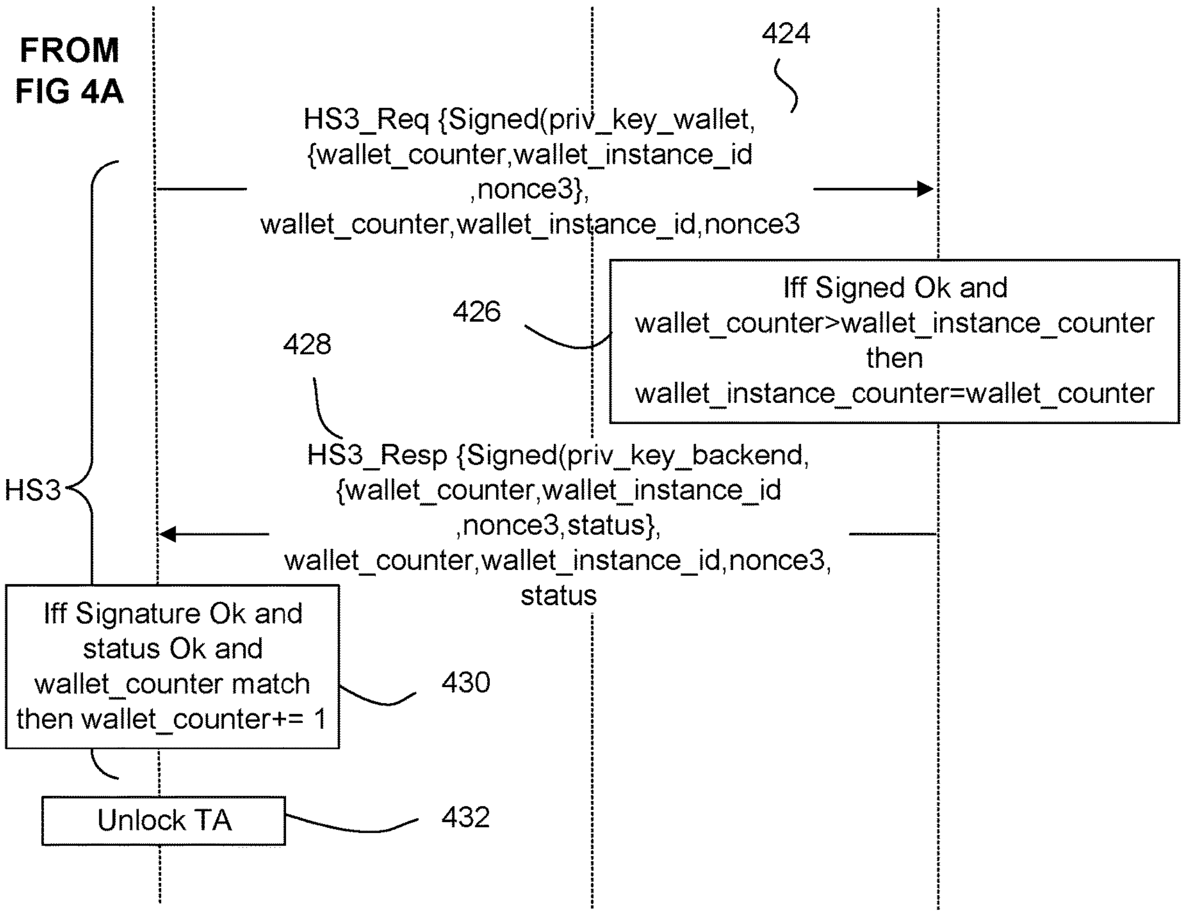

Hence, in FIGS. 4A-B, an exemplary handshake procedure 400 for the trusted application TA and the computerized backend resource BE is visualized. The handshake procedure is a multi-step handshake procedure, i.e. having at least two handshakes, wherein each handshake includes an access request and an access response. The flow also visualizes a Man-in-the-Middle MM. The Man-in-the-Middle MM may for instance be a payment application service (for details of an example, please refer to FIG. 5). The payment application service may invoke execution of a secure digital wallet, wherein the secure digital wallet corresponds to the trusted application TA. It is recalled that the trusted application TA comprises protected functionality and data.

A prerequisite of the handshake procedure 400 is that the trusted application TA is starting in a locked mode in which access to the protected functionality and data is prohibited. This is the case for the original trusted application TA as well as any additional number of trusted application instances possibly being generated as a result of cloning.

The term "starting" is referring to a state between a terminated mode and an executing mode. The trusted application TA may be starting for a variety of reasons, for instance during reboot of the associated host device, when the trusted application TA is awaken from an idle mode, when the trusted application TA has crashed and is restarting, and so forth.

The objective of the handshake procedure 400 is to verify that a current execution state of the trusted application TA has not already been occupied by another instance of the trusted application TA. Only upon successful verification as reported by the handshake procedure 400, the trusted application TA is allowed to switch to an unlocked mode in which access to the protected functionality and data is permitted. The present inventor has realized three important aspects that have been taken into consideration in the following implementation of the handshake procedure 400.

First, it has been realized that inherent behavior of the secure execution environment (cf. the aforementioned trusted application fingerprints) does not allow more than one instance of the trusted application TA to be executed at a particular point in time. It can therefore be established that each step in the handshake procedure 400 can only be performed by one instance of the trusted application TA at a time. Analogously, even if an arbitrary number of trusted application instances are generated, the operating system would only allow a single instance to be verified as a response to successful verification by the handshake procedure 400. This implies that if some additional trusted application instance, or even the original trusted application TA, attempts to be verified by means of the handshake procedure 400, it can be identified that fraudulent use by cloning has occurred and action can thus be taken. Moreover, the problems discussed in the background section, for instance the double-spending problem, are addressed since the handshake procedure 400 will not allow multiple verified instances of the trusted application TA.

Secondly, it has been realized that upon a clone of the trusted application TA being generated, it always restarts. Hence, upon executing the trusted application TA as a new instance, it has just been restarted. This behavior is utilized in order to verify that the current execution state of the trusted application TA has not already been occupied by another instance thereof upon startup of the trusted application TA or an execution switch thereto, or any trusted application instance, the handshake procedure 400 is therefore triggered.

Thirdly, it has been realized that care needs to be taken in view of potential Man-in-the-Middle MM attacks that can manipulate requests or responses associated with the handshake procedure 400. Manipulation can involve, for instance, intercepting and injecting scripts or removing code from the data, blocking message transmission, performing one or more retransmissions of any of the messages being sent, or any other type of Man-in-the-Middle MM exploit.

At least the insights discussed above enable the following implementation of the handshake procedure 400. The computerized backend resource BE is, for brevity reasons, hereinafter simply being referred to as "backend". In light of the insights as discussed above, it is understood that each additional cloned instance of the trusted application TA will, when it is restarting (i.e. as caused by its generation), have the exact same handshake data as the trusted application instance used as a source of the cloning. Moreover, it is understood that each act performed by the trusted application TA is performed in the same way for any of the trusted application instances that is currently being executed.

As seen at initial steps 402, 404 of the handshake procedure 400, respective handshake data are set and maintained for the trusted application TA at 402, and for the backend BE at 404. For the trusted application TA, the handshake data may be part of the protected functionality and data thereof. Observe that the handshake data is typically only generated one time for the trusted application TA in preparation for the handshake procedure 400. Upon a trusted application clone being created, the handshake data of said trusted application clone will correspond to the handshake data of the source from which the clone was generated.

Switches between already generated trusted application instances will not reset the handshake data as defined at 402 and 404. Accordingly, the step 402 is only performed once for the original trusted application TA, and the step 404 is only performed once for the backend BE.

In one embodiment, the handshake data of the trusted application TA comprises a trusted application counter value wallet_counter. The trusted application counter value wallet_counter is set to an arbitrary starting value, for instance 0. Moreover, the handshake data of the backend BE comprises a backend counter value wallet_instance_counter for the trusted application TA. The backend counter value wallet_instance_counter is set to be equal or less than the trusted application counter value wallet_counter. As this procedure is done for each trusted application instance, the backend BE is configured to maintain a record BE_rec (also seen at 304 in FIG. 3) comprising a corresponding backend counter value wallet_instance_counter for each trusted application TA. The reason why the backend counter value wallet_instance_counter is not only set to be less than, but also equal to, the trusted application counter value wallet_counter is a deliberate design choice. This will be further discussed at step 410 of the handshake procedure 400.

In some embodiments, the handshake data comprises additional data. Additional data may include a unique identifier wallet_instance_id of the trusted application TA (cf. the aforementioned trusted application fingerprint). The unique identifier wallet_instance_id may be mapped to a corresponding identifier wallet_instance_context maintained by the backend BE. Alternatively or additionally, the additional data may comprise a respective private cryptographic key priv_key_wallet, priv_key_backend for the trusted application TA and the backend BE. The private cryptographic key priv_key_wallet of the trusted application TA may be used for signing data of handshake requests sent from the trusted application TA, for instance the trusted application counter value wallet_counter and the unique identifier wallet_instance_id. The private cryptographic key priv_key_backend of the backend BE may be used for signing data of handshake responses sent from the backend BE, for instance the backend counter value wallet_instance_counter and the unique identifier wallet_instance_id. The additional data may further comprise a root certificate cert_root issued by a root certificate authority, as well as a wallet certificate cert_wallet for containing a public encryption key corresponding to the private cryptographic key priv_key_wallet of the trusted application TA. The authenticity of the wallet certificate cert_wallet can be verified by the root certificate cert_root. The additional data may moreover comprise a backend certificate cert_backend for containing a public encryption key corresponding to the private cryptographic key priv_key_backend of the backend BE. The authenticity of the backend certificate cert_backend can be verified by the root certificate cert_root.

All of the additional data stored in the backend BE may be maintained in the record BE_rec. Accordingly, the backend BE is configured to map handshake data for each one of the trusted application instances.

As seen at step 406, the trusted application TA is configured to be started in a locked mode. For instance, the trusted application TA may store an access mode identifier being set to a logic FALSE during startup.

The handshake procedure 400 involves performing a first handshake HS1. At 408, the first handshake HS1 involves a first handshake request HS1_Req. The first handshake request HS1_Req comprises the trusted application counter value wallet_counter. Moreover, the first handshake request HS1_Req comprises the unique identifier wallet_instance_id and a one-time arbitrary number, for instance a cryptographic nonce nonce1. All of the data included in the first handshake request HS1_Req is signed using the private key priv_key_wallet of the trusted application TA.

At 410, the backend BE first verifies the signature of the trusted application TA using the wallet certificate cert_wallet (preferably after having verified the wallet certificate cert_wallet using the root certificate cert_root). If the signature is successfully verified, the backend BE then checks that the trusted application counter value wallet_counter is greater than or equal to the backend counter value wallet_instance_counter. If this is true, the backend counter value wallet_instance_counter is set to be equal to the trusted application counter value wallet_counter and the first handshake request HS1_Req is confirmed at 412 by setting a status indicator status to an affirmative value, such as TRUE or OK.

Observe that it is a deliberate design choice to not only confirm the first handshake request HS1_Req upon the trusted application counter value wallet_counter being greater than the backend counter value wallet_instance_counter, but also equal thereto. This relates to the design choice for the backend counter value wallet_instance_counter as discussed at 404. The consequence of also confirming the first handshake request HS1_Req upon the counters being equal is that retransmission of the first handshake request HS1_Req is possible. The skilled person knows that access request and response messages may be lost for a variety of reasons, e.g. due to timeouts, network issues, incorrect package sizes, and so forth. This particular design choice therefore makes it possible for the trusted application TA to retransmit the messages in case of said messages being dropped, while at the same time preventing another trusted application instance from unlocking.

Once having passed the check at 410, the first handshake HS1 further involves sending a first handshake response HS1_Resp at 412 to the trusted application TA. The first handshake response HS1_Resp is a message to the trusted application TA, i.e., a confirmation that the first handshake request HS1_Req has validly passed. It is recalled that in data networking, a passed handshake response corresponds to an acknowledgement (ACK) and an erroneous handshake response corresponds to a negative acknowledgement (NACK). The data of the first handshake response HS1_Resp is signed with the private key priv_key_backend of the backend BE.

Upon receiving the first handshake response HS1_Resp 412 (i.e. the confirmation) at 414, the trusted application TA first verifies the signature of the backend BE using the backend certificate cert_backend (preferably after having verified the backend certificate cert_backend using the root certificate cert_root). Moreover, it is confirmed that the value of status is affirmative, as was discussed above. If the signature is successfully verified, the trusted application TA then increments the trusted application counter value wallet_counter, in this example by one. Other granularities can of course be realized. It is important that the trusted application counter value wallet_counter is not incremented until the response 412 is received. If the trusted application counter value wallet_counter would instead be incremented at some other time, for instance upon sending the first handshake request HS1_Req, sophisticated switching between trusted application instances could potentially cause more than one trusted application instance to be verified, i.e. accomplishing unwanted behavior. If step 414 executes, the first handshake HS1 is completed successfully.

The handshake procedure 400 further involves performing a second handshake HS2. The steps 416, 420 and 422 of the second handshake HS2 are similar to the corresponding steps 408, 412, 414 of the first handshake HS1. However, one important difference between the first and second handshakes HS1, HS2 can be seen in step 418. In order to confirm a second handshake request HS2_Req sent from the trusted application TA to the backend BE, the trusted application counter value wallet_counter must be strictly greater than the backend counter value wallet_instance_counter. The second handshake request HS2_Req thus cannot be confirmed if it is established that the currently executing trusted application instance is older than a most recent execution state of the trusted application TA according to the record BE_rec maintained by the backend BE.

The handshake procedure 400 further involves performing a third handshake HS3. The steps 424, 426, 428 and 430 of the third handshake HS3 are identical to the corresponding steps 416, 418, 420 and 422 of the second handshake HS2, with the only exception that the data comprises different values. In the present implementation, the third handshake HS3 effectively prevents fraudulent use by cloning mid-way in the handshake procedure 400.

Some implementations or device infrastructures comprise rules that only allow cloning before the handshake procedure 400 is initiated. For such implementations or infrastructures, the third handshake HS3 may not be necessary. The third handshake HS3 effectively prevents fraudulent use of clones being created somewhere during the execution of the handshake procedure 400.

Upon incrementing the trusted application counter value wallet_counter at 430, the handshake procedure 400 further involves a final step 432 of unlocking the trusted application TA. At this time, it is certain that only one trusted application instance, be it the original trusted application TA or be it any clone thereof, has been successfully verified. In this embodiment, successful verification by the handshake procedure 400 thus requires completion of the first, second and third handshakes HS1, HS2, HS3. The access mode identifier may be set to a logic TRUE value, thereby switching the trusted application TA to an unlocked mode in which access to the protected functionality and data is permitted. Hence, when the trusted application TA has been unlocked at 432, a completion of the handshake procedure 400 has been achieved. As is also evident given the foregoing disclosure, the handshake procedure 400 would also be completed upon reaching step 414, 422 or 430, but said steps 414, 422 or 430 would not execute. In this case, however, the handshake would be completed in an unsuccessful manner. A reason for this could, for example, be that the signature would not match, the status would not be “Ok”, and/or the wallet counter would not match an expected wallet counter value caused by e.g., fraudulent use by cloning of the trusted application TA.

In one embodiment, the second and third handshakes HS2, HS3 may be associated with response or request timeout periods. For instance, the trusted application TA may require that, after having sent a handshake request HS2_Req, HS3_Req, a corresponding response HS2_Resp, HS3_Resp is solicited within a certain time period. If a response is not received within said certain time period, it may be an indication of fraudulent behavior. Alternatively, it may be an indication of a temporary transmission problem in the communication between the trusted application TA and the backend BE, as mentioned above for step 410. To this end, in embodiments of the invention, when performing the second or the third handshake HS2, HS3, the trusted application TA is configured for detecting the lapse of said certain timeout period between the reporting of the trusted application counter value wallet_counter to the backend BE (step 416 or 424) and the receiving of the confirmation from the backend BE (step 420 or 428). Upon detecting such a timeout, the trusted application TA may be configured for aborting the handshake procedure 400, or reverting to the first handshake HS1 of the handshake procedure 400.

Throughout the entire handshake procedure 400, either one of the trusted application TA or the backend BE may report unexpected requests or responses. An unexpected request or response may be an unsuccessful verification of a trusted application instance. Unexpected requests or responses may be an indication that fraudulent behavior is occurring. For instance, if some data of the requests or responses is not corresponding to a particular value that is expected, fraudulent behavior might be the cause. This may be the case when one or more instances of the trusted application TA has been generated and execution status is continuously switched therebetween. Alternatively, if one or more additional requests or responses are received somewhere in the flow which should not be received at that particular time, this may indicate that the Man-in-the-Middle MM has intercepted the message and potentially attempting to exploit the system. Other such scenarios will be understood by the skilled person. The reports as discussed above may, for instance, be reported to a master user. A master user may be an application provider service of the trusted application TA.

Note that the handshake procedure 400 of the flow diagram being described with reference to FIGS. 4A-B is merely an exemplary implementation of a handshake procedure. Any alternative implementation within the scope of the present disclosure may alternatively be realized.

It has been discussed that the subject-matter of this document aims to prevent fraudulent use of cloning of a trusted application TA, wherein clones can be generated at any time during a lifetime of the trusted application TA. This will now be shown in three different examples of handshake procedures. The following examples are derived directly from the handshake procedure 400 according to FIGS. 4A-B, wherein each example illustrates the counter value progression of the trusted application TA, a trusted application clone, and the backend BE, in relation to a corresponding current execution. Other counter value progressions could alternatively be realized using other handshake procedure implementation schemes. Moreover, the counters may alternatively be incremented or decremented (i.e. changed) in any granularity after any execution step. Although the examples below illustrate one single clone instance, similar handshake procedures can of course be realized for any number of clone instances.

A first example is shown in Table 1. Table 1 represents a basic procedure wherein no trusted application clone is generated throughout the handshake procedure. Accordingly, the counter value associated with the (non-existing) trusted application clone remains undefined ("undef"). Following Table 1, first execution steps 402, 404 are to set the handshake data. Herein the counters of the original trusted application and the backend, respectively, are set to an arbitrary value, in this example 0, and the access mode is set to locked. Following the execution steps 414, 422, 430, it is seen that the trusted application counter value is progressively being incremented by one at each execution step. Moreover, following the execution steps 410, 418, 426, it is seen that the backend counter value assumes the current value of the trusted application counter value at the corresponding execution steps. At step 432, the handshake procedure for the trusted application TA is verified. Hence, the access mode is switched to unlocked, thereby allowing access to the protected functionality and data of the trusted application TA.

TABLE 1

No clone generation

| Current execution | counter_ TA(orig) | counter_ TA(clone) | counter_ backend |
|---|---|---|---|
| TA(orig)_402, 404 | 0, locked | Undef | 0 |
| TA(orig)_410 | 0 | Undef | 0 |
| TA(orig)_414 | 1 | Undef | 0 |
| TA(orig)_418 | 1 | Undef | 1 |
| TA(orig)_422 | 2 | Undef | 1 |
| TA(orig)_426 | 2 | Undef | 2 |
| TA(orig)_430 | 3 | Undef | 2 |
| TA(orig)_432 | 3, unlocked | Undef | 2 |

A second example is shown in Table 2. In this example, a trusted application clone is created one time and an execution switch thereto occurs at the same time, as indicated by "GEN/SW" in the "current execution" column. When the cloned trusted application instance is generated, the counter value of the clone is assuming the same handshake data as the original trusted application instance, in this example counter value=1 and access mode=locked. Since no additional switches occur during the handshake procedure, the clone will continue to execute generally according to the first example shown in Table 1 albeit for the clone instead of the original trusted application. The clone is ultimately being unlocked and thus given access to the protected functionality and data of the trusted application TA.

TABLE 2

One clone TA(clone) being created, no switches

| Current execution | counter_ TA(orig) | counter_ TA(clone) | counter_ backend |
|---|---|---|---|
| TA(orig)_402, 404 | 0, locked | Undef | 0 |
| TA(orig)_410 | 0 | Undef | 0 |
| TA(orig)_414 | 1 | Undef | 0 |
| GEN/SW: TA(clone) | 1 | 1, locked | 1 |
| TA(clone)_410 | 1 | 1 | 1 |
| TA(clone)_414 | 1 | 2 | 1 |
| TA(clone)_418 | 1 | 2 | 2 |
| TA(clone)_422 | 1 | 3 | 2 |
| TA(clone)_426 | 1 | 3 | 3 |
| TA(clone)_430 | 1 | 4 | 3 |
| TA(clone)_432 | 1 | 4, unlocked | 3 |

A third example is shown in Table 3. In this example, a cloned trusted application instance is generated and a switch thereto is performed, as indicated by "GEN/SW". After the first handshake performed by the clone, i.e. at step 414, another switch "SW" is performed such that the currently executing trusted application instance is once again the original instance. Since the counter value of the original trusted application instance is 1, and the backend counter value is still 1, the original trusted application instance can continue to execute through the steps 410, 414, 418, 422, 426 and 430. Now, an additional switch "SW" is performed such that the currently executing trusted application instance is once more the clone, as seen in the table. The counter value of the clone is, however, still 2, since no further handshakes have been performed for the clone but only for the original trusted application instance. Accordingly, at the subsequent execution step 410 for the clone, the backend BE notes that the check is unsuccessful due to the clone counter value=2 being less than the backend counter value=3 for the most recent execution state of the trusted application, i.e. the original instance. The handshake procedure is thus aborted, and unsuccessful verification of the trusted application instance may be reported, for instance to an application provider service or, in the case of FIG. 5, a payment service provider or a bank service.

TABLE 3

One clone TA(clone) being created, three switches occurring: TA(orig) → TA(clone), TA(clone) → TA(orig), and finally TA(orig) → TA(clone)

| Current execution | counter_ TA(orig) | counter_ TA(clone) | counter_ backend |
|---|---|---|---|
| TA(orig)_402, 404 | 0, lock | undef | 0 |
| TA(orig)_410 | 0 | undef | 0 |
| TA(orig)_414 | 1 | undef | 0 |
| GEN/SW: TA(clone) | 1 | 1, lock | 1 |
| TA(clone)_410 | 1 | 1 | 1 |
| TA(clone)_414 | 1 | 2 | 1 |
| SW: TA(orig) | 1 | 2 | 1 |
| TA(orig)_410 | 1 | 2 | 1 |
| TA(orig)_414 | 2 | 2 | 1 |
| TA(orig)_418 | 2 | 2 | 2 |
| TA(orig)_422 | 3 | 2 | 2 |
| TA(orig)_426 | 3 | 2 | 3 |
| TA(orig)_430 | 4 | 2 | 3 |
| SW: TA(clone) | 4 | 2 | 3 |
| TA(clone)_410 | 4 | 2, abort/report | 3 |

In the examples presented in Tables 1-3 above, as well as for other alternative handshake procedures, the original trusted application instance and the cloned trusted application instance maintain a representation of its execution state in the form of the counters. The representation is a monotonic function of execution progress, wherein the current execution state is reported to the backend BE during the handshake procedure. The reporting of current execution state corresponds to the point in time wherein the handshake requests are received by the backend BE and the backend counter value is assuming the value of the currently executing trusted application instance. The backend BE thereby maintains a record BE_rec of most recently reported execution state for each one of the trusted application instances.

Other examples of clone generation and/or switching than the ones presented in Tables 1-3 can be derived from FIGS. 4A-B. However, they would all lead to the same conclusion that the handshake procedure does not allow more than one instance of the trusted application to be verified. The problems discussed in the background section are thus addressed.

Figure 5:
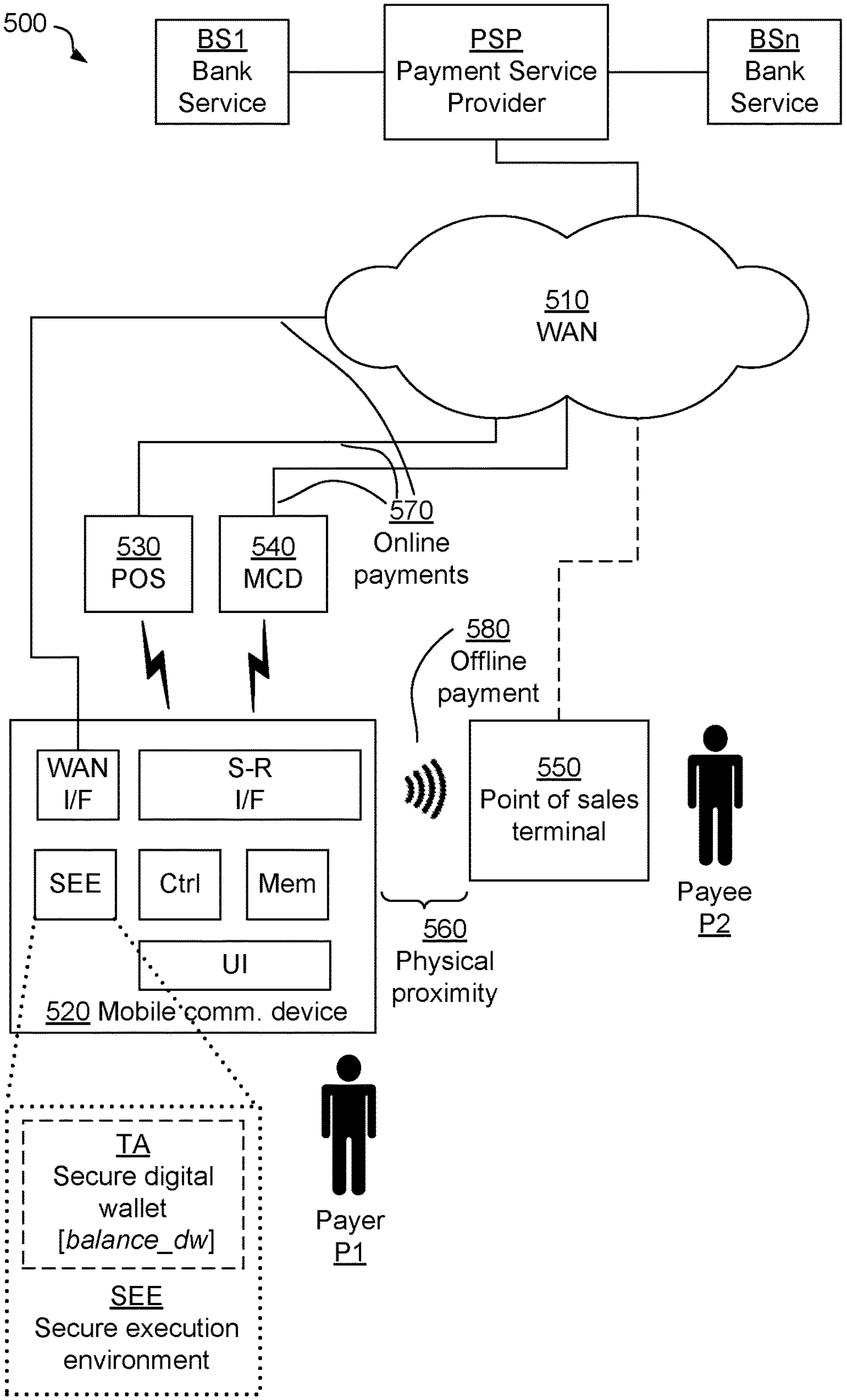
FIG. 5 is a schematic block diagram of a digital payment system, the security of which may be improved thanks to the present invention.

FIG. 5 illustrates a digital payment system 500 allowing payers to make digital payments to payees. As mere examples, the digital cash transfer system 500 in FIG. 5 comprises a mobile communication device 520 for use by a payer P1 and a point-of sales terminal 550 operated by a payee P2. The mobile communication device 520 may be a host device HD as referred to above for the preceding drawings.

The mobile communication device 520 has an interface WAN I/F for wide area network data communication via a wide area network 510, as well as an interface S-R I/F for short-range wireless data communication. Moreover, the mobile communication device 520 has a processing device Ctrl that serves as a controller of the mobile communication device 520 and that may be implemented in any known controller technology, including but not limited to microcontroller, processor (e.g. PLC, CPU, DSP), FPGA, ASIC or any other suitable digital and/or analog circuitry capable of performing the intended functionality. The mobile communication device 520 further has a memory Mem that may be implemented in any known memory technology, including but not limited to ROM, RAM, SRAM, DRAM, CMOS, FLASH, DDR, SDRAM, SSD or magnetic hard disk, or some other memory technology. In some embodiments, the memory or parts thereof may be integrated with or internal to the processing device Ctrl. The memory Mem may store program instruction for execution by the processing device Ctrl, as well as temporary and permanent data for use by the processing device Ctrl.

The mobile communication device 520 has a user interface UI, as is commonplace in the art. The user interface UI comprise an input device and a presentation device. The input device and the presentation device may be constituted by one common physical device, such as for instance a touch screen (touch-sensitive display screen), implemented in for instance resistive touch technology, surface capacitive technology, projected capacitive technology, surface acoustic wave technology or infrared technology.

As has been explained above, the mobile communication device 520 is configured for enabling the payer P1 to make digital payments by any or all of the available communication channels, i.e. using any or all of the wide area network data communication (cf. interface WAN I/F) and short-range wireless data communication (cf. interface S-R I/F).

The short-range data communication interface S-R I/F may be configured for Bluetooth communication, or any other radio-based short-range wireless data communication such as, for instance, Bluetooth Low Energy, RFID, WLAN, WiFi, mesh communication or LTE Direct, without limitation, or any non-radio-based short-range wireless data communication such as, for instance, magnetic/inductive communication (such as NFC), (ultra)sound communication, or optical communication (such as IrDA) without limitation. In some embodiments, the short-range data communication interface S-R I/F comprises equipment and functionality for presenting and/or scanning a QR code.

The wide area network communication interface WAN I/F may be configured for wide area network communication compliant with, for instance, one or more of W-CDMA, GSM, UTRAN, HSPA, LTE, LTE Advanced or 5G, and TCP/IP, and/or WLAN (WiFi), without limitation.

To support digital payments, the mobile communication device 520 has a secure digital wallet OW, implemented as a trusted application TA executable in a secure execution environment, SEE, as described above. The mobile communication device 520 will typically also have a payment application executing as a normal application NA (cf. the preceding description with reference to FIGS. 1 and 2). The payer P1 may interact through the user interface UI with the payment application (not shown in FIG. 5) to use a payment application service provided by a payment service provider PSP or a bank service BS1 . . . BSn.

Through the payment application, the payer P1 can make digital payments from the secure digital wallet OW as online payments 570 by communicating with other entities like a point-of sales, POS, terminal 530, another mobile communication device, MCD, 540, or directly with a payment service provider PSP that provides a payment application service. Such digital payment are online in the sense that the performance thereof will involve instant communication with cloud-based resources like the payment service provider PSP, bank services BS1 . . . BSn, etc., for payment verification, clearing and settlement.

The payer P1 can furthermore make digital payments from the secure digital wallet OW as offline payments 580 by short-range wireless communication with another nearby device (exemplified as a point-of-sales terminal 550) when being in physical proximity 560. Unlike the online digital payments 570, the offline digital payment 580 does not require momentary access to any of the cloud-based resources PSP, BS1 . . . BSn at the time of making the offline digital payment. The offline digital payment may be buffered at the POS 550 (and/or the mobile communication device 520) and subsequently communicated to the cloud-based resources PSP, BS1 . . . BSn when communication over the WAN 510 is available. This is indicated by a broken line between the POS 550 and WAN 510 in FIG. 5.

Every offline digital payment of the payer P1 (as well as every online digital payment unless being made by directly charging an account of the payer P1 held at any of the cloud-based resources PSP, BS1 . . . BSn) will be made against a local balance balance_dw of the secure digital wallet/trusted application TA in the mobile communication device 520. Hence, the local balance balance_dw is an example of protected data of the trusted application TA.

Typically, the local balance balance_dw will be reduced by an amount identical to or at least corresponding to the payment amount of the digital payment made. When the local balance balance_dw has been consumed, the payer P1 may make a replenishment by requesting a top-up of the secure digital wallet at the cloud-based resources PSP, BS1 . . . BSn. Examples of protected functionality of the trusted application TA are, hence, the procedures for reducing the local balance balance_dw at offline digital payment and for topping-up the secure digital wallet.

However, and needless to say, if clones of the secure digital wallet/trusted application TA were allowed to execute in the mobile communication device 520, there could be highly undesired situations of double-spending. This is particularly so for offline digital payments 580, since there is no online payment verification being made at the time of offline payment. The present invention presents advantageous fraud-prevention measures in this regard.

Some non-limiting examples of suitable technology for digital payments are described in the present applicant's PCT applications PCT/SE2020/051251, PCT/SE2021/050556, PCT/SE2022/050090 and PCT/SE2022/050152, as well as Swedish applications SE 2151401-3 and SE 2250076-3.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of preventing fraudulent use by cloning of a trusted application executable in a secure execution environment of a host device, the method involving:

the trusted application starting in a locked mode in which access to protected functionality and data of the trusted application is prohibited;

the trusted application performing a handshake procedure with a computerized backend resource to verify that a current execution state of the trusted application has not already been occupied by another instance of the trusted application; and only upon successful verification by the handshake procedure, the trusted application switching to an unlocked mode in which access to the protected functionality and data is permitted, wherein the computerized backend resource maintains a record of most recent execution states as reported by instances of trusted applications during previous handshake procedures, wherein the trusted application reports the current execution state to the computerized backend resource during the handshake procedure, and wherein the computerized backend resource aborts the handshake procedure if the reported current execution state is older than the most recent execution state of the trusted application according to the record maintained by the computerized backend resource, wherein the trusted application maintains a representation of its execution state, the representation being a monotonic function of execution progress, wherein the trusted application reports the current execution state to the computerized backend resource during the handshake procedure by communicating a current value of said representation, and wherein the record maintained by the computerized backend resource contains a corresponding value of said representation at said most recently reported execution state of said trusted application, wherein the representation of execution state maintained by the trusted application comprises a trusted application counter value being incremented during the handshake procedure, and wherein the record maintained by the computerized backend resource comprises a corresponding backend counter value for the trusted application, wherein the handshake procedure for the trusted application involves:

performing a first handshake comprising:

the trusted application reporting the trusted application counter value to the computerized backend resource;

the computerized backend resource checking that the trusted application counter value is greater than or equal to the backend counter value for the trusted application, setting the backend counter value to be equal to the trusted application counter value, and sending a confirmation to the trusted application;

the trusted application, upon receiving the confirmation from the computerized backend resource, incrementing the trusted application counter value; and performing a second handshake comprising:

the trusted application reporting the trusted application counter value to the computerized backend resource;

the computerized backend resource checking that the trusted application counter value as reported by the trusted application is strictly greater than the backend counter value for the trusted application, setting the backend counter value to be equal to the trusted application counter value, and sending a confirmation to the trusted application; and the trusted application, upon receiving the confirmation from the computerized backend resource, incrementing the trusted application counter value, and wherein successful verification by the handshake procedure requires completion of the first as well as the second handshakes.

2. The method according to claim 1, wherein the handshake procedure for the trusted application involves:

in addition to the first and second handshakes, performing a third handshake being identical to the second handshake, wherein successful verification by the handshake procedure requires completion of the first, second as well as third handshakes.

3. The method according to claim 2, wherein each handshake comprises signing a unique identifier of the trusted application and the trusted application counter value with a private cryptographic key of the trusted application and the computerized backend resource, respectively.

4. The method according to claim 3, wherein each handshake further comprises signing a cryptographic nonce with the respective private cryptographic key.

5. The method according to claim 2, further involving the trusted application, in the second or the third handshake:

detecting lapse of a timeout period between the reporting of the trusted application counter value to the computerized backend resource and the receiving of the confirmation from the computerized backend resource; and doing one of the following:

aborting the handshake procedure; or reverting to the first handshake of the handshake procedure.

6. The method according to claim 1, further involving reporting unsuccessful verification of a trusted application instance to an application provider service.

7. The method according to claim 1, wherein the trusted application is a secure digital wallet for a payment application service.

8. The method according to claim 7, wherein the protected functionality and data of the trusted application comprises a balance of the secure digital wallet.

9. The method according to claim 1, wherein the secure execution environment is a trusted execution environment, and wherein the protected functionality and data is maintained in protected hardware resources and executable by the trusted application being in the unlocked mode and running in the trusted execution environment.

10. The method according to claim 1, wherein the secure execution environment is a software-based virtual execution environment, and wherein the protected functionality and data is maintained in an encrypted virtual storage and executable by the trusted application being in the unlocked mode and running in the software-based virtual execution environment.

11. A system for preventing fraudulent use by cloning of a trusted application, the system comprising:

a computerized backend resource; and a host device, the host device being configured for running the trusted application executable in a secure execution environment of the host device, and the host device being configured to start the trusted application in a locked mode in which access to protected functionality and data of the trusted application is prohibited, perform a handshake procedure for the trusted application with the computerized backend resource to verify that a current execution state of the trusted application has not already been occupied by another instance of the trusted application, and only upon successful verification by the handshake procedure, switch the trusted application to an unlocked mode in which access to the protected functionality and data is permitted, wherein the computerized backend resource is configured to maintain a record of most recent execution states as reported by instances of trusted applications during previous handshake procedures, wherein the trusted application reports the current execution state to the computerized backend resource during the handshake procedure, and wherein the computerized backend resource is configured to abort the handshake procedure if the reported current execution state is older than the most recent execution state of the trusted application according to the record maintained by the computerized backend resource, wherein the trusted application maintains a representation of its execution state, the representation being a monotonic function of execution progress, wherein the trusted application reports the current execution state to the computerized backend resource during the handshake procedure by communicating a current value of said representation, and wherein the record maintained by the computerized backend resource contains a corresponding value of said representation at said most recently reported execution state of said trusted application, wherein the representation of execution state maintained by the trusted application comprises a trusted application counter value being incremented during the handshake procedure, and wherein the record maintained by the computerized backend resource comprises a corresponding backend counter value for the trusted application, wherein the handshake procedure for the trusted application involves:

performing a first handshake comprising:

the trusted application reporting the trusted application counter value to the computerized backend resource;

the computerized backend resource checking that the trusted application counter value is greater than or equal to the backend counter value for the trusted application, setting the backend counter value to be equal to the trusted application counter value, and sending a confirmation to the trusted application; and the trusted application, upon receiving the confirmation from the computerized backend resource, incrementing the trusted application counter value; and performing a second handshake comprising:

the trusted application reporting the trusted application counter value to the computerized backend resource;

the computerized backend resource checking that the trusted application counter value as reported by the trusted application is strictly greater than the backend counter value for the trusted application, setting the backend counter value to be equal to the trusted application counter value, and sending a confirmation to the trusted application; and the trusted application, upon receiving the confirmation from the computerized backend resource, incrementing the trusted application counter value, and wherein successful verification by the handshake procedure requires completion of the first as well as the second handshakes.

12. The system according to claim 11, wherein the handshake procedure for the trusted application involves:

in addition to the first and second handshakes, performing a third handshake being identical to the second handshake, wherein successful verification by the handshake procedure requires completion of the first, second as well as third handshakes.

13. The system according to claim 12, wherein each handshake comprises signing a unique identifier of the trusted application and the trusted application counter value with a private cryptographic key of the trusted application and the computerized backend resource, respectively.

14. The system according to claim 13, wherein each handshake further comprises signing a cryptographic nonce with the respective private cryptographic key.

15. The system according to claim 12, further involving the trusted application, in the second or the third handshake:

detecting lapse of a timeout period between the reporting of the trusted application counter value to the computerized backend resource and the receiving of the confirmation from the computerized backend resource; and doing one of the following:

aborting the handshake procedure; or reverting to the first handshake of the handshake procedure.

16. The system according to claim 11, further involving reporting unsuccessful verification of a trusted application instance to an application provider service.

17. The system according to claim 11, wherein the trusted application is a secure digital wallet for a payment application service.

18. The system according to claim 17, wherein the protected functionality and data of the trusted application comprises a balance of the secure digital wallet.

19. The system according to claim 11, wherein the secure execution environment is a trusted execution environment, and wherein the protected functionality and data is maintained in protected hardware resources and executable by the trusted application being in the unlocked mode and running in the trusted execution environment.

20. The system according to claim 11, wherein the secure execution environment is a software-based virtual execution environment, and wherein the protected functionality and data is maintained in an encrypted virtual storage and executable by the trusted application being in the unlocked mode and running in the software-based virtual execution environment.

* * * * *